United States Patent Office 3,780,125
Patented Dec. 18, 1973

3,780,125
ISOMERIZATION OF ALPHA-PINENE-CONTAINING FEED BY ZEOLITE
Edward Andrew Takacs, 4 Ave. C,
South Norwalk, Conn. 06854
No Drawing. Filed Dec. 18, 1972, Ser. No. 316,147
Int. Cl. C01b 33/28; C07c 13/00; C09f 3/02
U.S. Cl. 260—675.5                                     10 Claims

ABSTRACT OF THE DISCLOSURE

There is disclosed a process for preparing dipentene by effecting the isomerization of a pinene containing feed at a temperature of from about 140° C. to about 200° C. for more than about one-half hour in the presence of less than about 10%, based on the weight of the said feed, of a zeolite molecular sieve catalyst of either the 13X- or 13Y-type containing an alkali metal cation, such as sodium, potassium, lithium, rubidium, or cesium, said catalyst being activated by adjusting the pH of an aqueous slurry to a range from about 5.0 to about 10 prior to use.

---

The present invention relates to an improved process for the isomerization of terpenes, in particular turpentine, α-pinene, or β-pinene. More particularly, it relates to the production of dipentene by the isomerization of turpentine, α-pinene or β-pinene, by means of heating in the presence of a selective catalyst. Still more particularly, the invention in concerned with the isomerization of α-pinene feed in the presence of a selective zeolite catalyst, prepared by prior adjustment of the pH of an aqueous slurry of the catalyst from between about 5 and about 10 to attain improved reactivity rates and enhanced selectivity, whereby dipentene is produced in good yields.

As is known, dipentene is a useful component in the production of terpene resins used in hot-melt coatings, adhesives, and the like. Its preparation is generally known as evidenced in the prior art for effecting the isomerization of α-pinene. Thus, Kharasch and Reynold, U.S. Pat. No. 2,382,641, teach the conversion of optically active α-pinene to limonene (the optically active form of dipentene) by heating α-pinene with organic acids, such as benzoylbenzoic or salicylic acids, in the presence of organic acid amides, such as formamide or acetamide, at 140°–200° C. for from fifteen to fifty hours. Contrariwise, process of the present invention is distinguished in that the use of substantial quantities of expensive organic acids and amides is avoided, and in that the isomerization is effected in about one-half hour to about sixteen hours, whereby excellent yields of dipentene are obtained.

Another example of the prior procedure is disclosed by Frilette and Weisz (U.S. Pat. No. 3,140,322) who teach the use of 10X zeolite to reduce polymer formation in the isomerization of α-pinene to yield camphene as the main product. In discussing the activity of 13X molecular sieves in the Journal of the American Chemical Society, vol. 64, at p. 382, Weisz and Frilette state that "α-pinene undergoes no reaction when refluxed with the Na$^+$ form (the 13X form), but is converted extensively to camphene by the Ca$^{++}$ salt."

Still another example of the prior practice is disclosed by Derfer et al. in U.S. Pat. 3,270,075 who teach the isomerization of α-pinene to a dipentene-rich isomerizate with a 10X or 13X zeolite at a temperature in the range of about 65° C. to about 110° C. Patentees specifically warn against using higher temperatures. For example, at column 8 therein at line 24 and following, it is stated that when temperatures of about 135° C. to 154° C. are employed, considerably more camphene is produced and, in most instances, camphene becomes the predominant product. Furthermore, in Example 1, at column 6, line 20, it is stated that when α-pinene is treated at 150° C. with a 13X molecular sieve catalyst, the isomerizate obtained is found to contain only 10% of the desired product.

It is, therefore, a principal object of this invention to provide an enhanced process for economically producing dipentene from a pinene or turpentine in good yield and in a shortened period of time. A further object is to provide a process wherein the amount of undesirable product is minimized. These and other objects will become apparent from a reading of the ensuing description.

It has now been unexpectedly found in accordance with the process of the present invention that high yields of dipentene can be obtained by isomerizing pinene or turpentine at temperatures of about 140° C. to about 200° C., using either a 13X or 13Y acid treated zeolite catalyst. Furthermore, only minor amounts of terpinolene and camphene are formed as by-products. The process may be carried out either batch-wise or continuously, and the catalyst is readily regenerated for further use.

In general, the zeolites employed in the present invention are alkali metal aluminosilicates, the alkali metal being sodium, potassium, lithium, rubidium, cesium, and the like.

Their crystal structures are such that they have a large number of pores characterized by uniform size.

Typically, the synthetic zeolite marketed as "Molecular Sieve 13X" and "Molecular Sieve 13Y" by Linde Division of the Union Carbide Corporation have the composition:

$$Na_{86}(AlO_2)_{86}(SiO_2)_{106} \cdot xH_2O,$$

and $Na_{56}(AlO_2)_{56}(SiO_2)_{136} \cdot xH_2O$, respectively, and an effective pore diameter of about 13 angstroms. As sold commercially, the zeolite or molecular sieve catalyst is substantially anhydrous, normally having a water content of about one percent. Although the catalyst is operative over a wide range of water content, the reaction proceeds at the fastest rate when the 13X molecular sieve catalyst has a water content of about one to about six percent and, preferably, four percent.

The potassium sieve (K sieve) and other alkali metal sieves, such as the lithium, cesium and rubidium sieves, are prepared by subjecting the corresponding 13X or 13Y sieves to a metathesis reaction. In general, all of the sieves, whether of the X or Y type are activated by treating an aqueous slurry with an inorganic acid, such as carbonic acid (or its anhydride, carbon dioxide), dilute hydrochloric acid, nitric acid, phosphoric acid or an organic acid, such as p-toluenesulfonic acid so as to obtain a slurry having a pH ranging from about 5.0 to about 10. The so-treated slurry is then filtered and the activated sieve thus obtained is dried by conventional means. The method of drying is not critical so long as 1–6% water content is retained. The latter sieve is now ready for use as a catalyst in the selective isomerization of the above-mentioned terpenes which in accordance with the practice of the present invention includes α-pinene, β-pinene as well as turpentine.

Surprisingly, when no pH adjustment of the commercially available molecular sieve catalyst is made, the rate of reaction is remarkably slow in that either large amounts of catalyst or extremely long reaction times are necessary to achieve an acceptable degree of isomerization. Unexpectedly, in accordance with the process of the invention, there is noted a substantial increase in the rate of reaction, namely, from about a five to a thousand fold increase, without concurrently affecting the selectivity of the isomerization reaction utilizing the catalysts of the present invention in an amount ranging from about 0.1% to about 10%, based on the weight of the feed being treated either in a batchwise or continuous manner.

In a preferred embodiment of the practice of this invention, a α-pinene is heated at reflux for from about 2 to 8 hours with from about 0.25% to 2% of a 13X or 13Y molecular sieve catalyst adjusted in an aqueous slurry to a pH of 6. The resulting isomerizate is then filtered to remove the molecular sieve which is then recycled, and the isomerizate is fractionated. There is noted at least a ten-fold increase in the rate of reaction as compared with an untreated sieve, without affecting the selectivity of the reaction.

The isomerization process of the present invention is generally carried out at temperatures of 140° C.–200° C. Preferred reaction temperatures are in the range of 150° C. to 175° C. In general, reaction times of 3 to 15 hours are effectively employed. The process may be carried out either batchwise or continuously and under autogenous, elevated, or reduced pressure.

The invention is further illustrated in conjunction with the following examples which are to be taken as illustrative and not by way of limitation. All parts are by weight unless otherwise noted.

EXAMPLE 1

Ten parts of a sieve having the formula:

$$Na_{86}(AlO_2)_{86}(SiO_2)_{106} \cdot xH_2O$$

are slurried in 100 parts of water. The pH of the aqueous slurry prior to adjustment is 11.1. The slurry is next adjusted to a pH level of 6.4 by passing a stream of gaseous carbon dioxide over the surface of the vigorously stirred mixture. The mixture is filtered, and the resultant filtered solids are then substantially dried for 18 hours at 230° C.

Its activity towards α-pinene is determined as follows: 100 parts of α-pinene and 1 part of the above prepared activated sieve are charged to a suitable reaction vessel. This mixture is blanketed with nitrogen and agitated with a magnetic stirrer. The latter mixture is rapidly heated to and maintained at reflux temperatures ranging from 157° C. to 173° C., during the course of the isomerization. The data obtained are recorded in the table below.

TABLE I

| pH of aqueous slurry | Conversion in percent | Yield based on pinene consumed at indicated level of conversion in percent. | | | | Conversion rate [k(min⁻¹)/ percent catalyst×10⁻⁴] |
|---|---|---|---|---|---|---|
| | | CA[1] | DI[2] | α plus α TER[3] | TERP[4] | |
| 11.1 (untreated) | 85.5 | 19.6 | 66.7 | 3.9 | 9.3 | 190.0 |
| 6.4 | 86.8 | 19.9 | 48.7 | 13.2 | 17.2 | 2,500.0 |

[1] Is camphene (CA).
[2] Is dipentene (DI).
[3] Is terpinene (TER).
[4] Is terpinolene (TERP).

Similar results are obtained when incorporating 2 parts of activated sieve as above defined or substituting β-pinene for α-pinene above.

EXAMPLE 2

K-X sieve-aqueous HCl activation

Ten parts of a sieve having the formula:

$$K_{86}(AlO_2)_{86}(SiO_2)_{106} \cdot xH_2O$$

previously prepared by metathesis from 13X sieve and potassium chloride, are slurried in 100 parts of water to give a mixture having a pH of 10.7. A small aliquot of this slurry is withdrawn for testing. The pH of the remaining slurry is adjusted with 0.5 N HCl and aliquots are withdrawn at various pH levels. All of the aliquots thus obtained are filtered and resultant filtered solids are dried for 18 hours at 230° C. These are tested for their activities towards α-pinene in the same manner as set forth in Example 1, above. The data obtained are recorded in the table below.

TABLE II

| pH of aqueous slurry | Conversion in percent | Yield based on pinene consumed at indicated level of conversion in percent. | | | | Conversion rate [k(min⁻¹)/ percent catalyst×10⁻⁴] |
|---|---|---|---|---|---|---|
| | | CA[1] | DI[2] | α plus γ TER[3] | TERP[4] | |
| 10.7 (untreated) | | | No measurable reaction | | | |
| 7.0 | 89.9 | 16.9 | 74.1 | 0.8 | 5.9 | 12.0 |
| 6.0 | 93.7 | 17.9 | 72.8 | 0.4 | 6.3 | 41.0 |
| 5.0 | 78.1 | 23.3 | 65.6 | 1.5 | 7.6 | 40.0 |

[1] Is camphene (CA).
[2] Is dipentene (DI).
[3] Is terpinene (TER).
[4] Is terpinolene (TERP).

Similar results are attained utilizing β-pinene or turpentine in lieu of α-pinene.

EXAMPLE 3

Preparation of K-X sieve-carbon dioxide activation

Ten parts of a K-X sieve, prepared by metathesis from commercial 13X and KCl as in Example 2 above, are slurried in 100 parts of water and the pH of the slurry is adjusted to desired pH level as noted in the table below by feeding a stream of gaseous $CO_2$ over the surface of a rapidly stirred mixture. Samples are removed at each indicated pH level, filtered and the resultant filtered solids are dried for 18 hours at 230° and their activity towards α-pinene determined as in Example 1 above. The results are tabularized below.

TABLE III

| pH of aqueous slurry | Conversion in percent | Yield based on pinene consumed at indicated level of conversion in percent. | | | | Conversion rate [k(min⁻¹)/ percent catalyst×10⁻⁴] |
|---|---|---|---|---|---|---|
| | | CA[1] | DI[2] | α plus γ TER[3] | TERP[4] | |
| 10.7 | | | No measurable reaction | | | |
| 8.0 | 51.3 | 16.7 | 75.5 | 0.4 | 5.1 | 4.3 |
| 7.0 | 69.6 | 17.0 | 75.1 | 0.4 | 5.2 | 10.0 |
| 6 | 84.3 | 19.2 | 74.2 | 6 | 5.4 | 19.0 |

[1] Is camphene (CA).
[2] Is dipentene (DI).
[3] Is terpinene (TER).
[4] Is terpinolene (TERP).

EXAMPLE 4

Preparation of Rb-X sieve-aqueous HCl activation

The procedure of Example 3 above is repeated in every detail except that the potassium chloride is replaced by rubidium chloride and the Rb-X molecular sieve catalyst is adjusted by means of 0.5 N HCl to a desired pH level as set forth in the table below. The isomerization results are shown in Table IV.

TABLE IV

| pH of aqueous slurry | Conversion in percent | Yield based on pinene consumed at indicated level of conversion in percent. | | | | Conversion rate [k(min.⁻¹)/ percent catalyst×10⁻⁴] |
| --- | --- | --- | --- | --- | --- | --- |
| | | CA[1] | DI[2] | α plus γ TER[3] | TERP[4] | |
| 10.5 | | No measurable reaction | | | | |
| 7.3 | 90.3 | 21.6 | 64.4 | 2.0 | 10.7 | 20.0 |

[1] Is camphene (CA).
[2] Is dipentene (DI).
[3] Is terpinene (TER).
[4] Is terpinolene (TERP).

Similar results are obtained when substituting cesium chloride for rubidium chloride in the above example.

EXAMPLE 5

Use of a K-Y molecular sieve

To a suitable reaction vessel equipped with stirrer and thermometer are added 100 parts of α-pinene and 2 parts of a molecular sieve having the formula:

$$K_{56}(AlO_2)_{56}(SiO_2)_{136} \cdot xH_2O$$

corresponding to a K-Y sieve and having previously been adjusted to various activities by means of 0.5 N HCl. The mixture is blanketed with nitrogen, agitated with a magnetic stirrer and rapidly heated to, and maintained at, reflux temperatures during the course of the isomerization. Yields of the desired dipentene and the rate at which the desired product is attained are recorded in the table below.

TABLE V

| pH of aqueous slurry | Conversion in percent | Yield based on pinene consumed at indicated level of conversion in percent | | | | Conversion rate [k(min.⁻¹)/ percent catalyst×10⁻⁴] |
| --- | --- | --- | --- | --- | --- | --- |
| | | CA[1] | DI[2] | α plus γ TER[3] | TERP[4] | |
| 10.7 (untreated) | | No measurable reaction | | | | |
| 10.0 | 22.5 | 18.7 | 75.9 | 0.4 | 2.2 | 6.8 |
| 9.6 | 83.5 | 19.2 | 75.2 | 0.6 | 4.6 | 50.0 |
| 9.0 | 92.8 | 17.7 | 72.1 | 3.1 | 7.1 | 340.0 |
| 6.0 | 97.3 | 17.3 | 59.9 | 2.9 | 12.5 | 4,100.0 |

[1] Is camphene (CA).
[2] Is dipentene (DI).
[3] Is terpinene (TER).
[4] Is terpinolene (TERP).

EXAMPLE 6

Repeating Example 5 in every detail except that a K-Y molecular sieve is treated with $CO_2$ prior to isomerization, the data obtained is recorded in Table VI below.

TABLE VI

| pH of aqueous slurry | Conversion in percent | Yield based on pinene consumed at indicated level of conversion in percent. | | | | Conversion rate [k(min.⁻¹)/ percent catalyst×10⁻⁴] |
| --- | --- | --- | --- | --- | --- | --- |
| | | CA[1] | DI[2] | α plus γ TER[3] | TERP[4] | |
| 10.3 | | No measurable reaction | | | | |
| 9.0 | 84.4 | 18.4 | 71.6 | 2.9 | 6.9 | 4.6 |
| 8.0 | 92.0 | 18.8 | 69.1 | 4.0 | 7.9 | 69.0 |
| 7.0 | 86.6 | 19.4 | 66.9 | 4.8 | 8.5 | 670.0 |
| 6.0 | 86.8 | 19.6 | 65.1 | 5.9 | 9.1 | 1,300.0 |

[1] Is camphene (CA).
[2] Is dipentene (DI).
[3] Is terpinene (TER).
[4] Is terpinolene (TERP).

EXAMPLE 7

Use of Rb-Y sieve

Ten parts of a Rb-Y sieve, corresponding to the formula $Rb_{56}(AlO_2)_{56}(SiO_2)_{136} \cdot xH_2O$ and previously prepared by metathesis from an Na-Y sieve and RbCl, are slurried in 100 parts of water, and the pH of the slurry is adjusted by means of $CO_2$ gas to a pH of 5.65. The mixture is then filtered and the solids thus obtained are dried for 18 hours at 230° C. and evaluated as a catalyst as in Example 1 above for the isomerization of α-pinene. The results obtained are shown in Table VII below.

TABLE VII

| pH of aqueous slurry | Conversion in percent | Yield based on pinene consumed at indicated level of conversion in percent. | | | | Conversion rate [k(min.⁻¹)/ percent catalyst×10⁻⁴] |
| --- | --- | --- | --- | --- | --- | --- |
| | | CA[1] | DI[2] | α plus γ TER[3] | TERP[4] | |
| 10.3 (untreated) | | No measurable reaction | | | | |
| 5.65 | 92.0 | 16.9 | 76.1 | 1.1 | 5.4 | 220.0 |

[1] Is camphene (CA).
[2] Is dipentene (DI).
[3] Is terpinene (TER).
[4] Is terpinolene (TERP).

A significant advantage of the present process is that a more rapid rate of conversion of a pinene feed to dipentene occurs when utilizing any of the activated catalysts above-described as compared with the utilization of untreated catalysts per se.

I claim:

1. A process for preparing dispentene comprising isomerizing a pinene containing feed at a temperature from about 140° C. to about 200° C. for more than one-half hour in the presence of from about 0.1% to about 10%, based on the weight of said feed, of a molecular sieve catalyst derived from either the 13X or 13Y type containing an alkali metal cation selected from the group consisting of sodium, potassium, lithium, rubidium and cesium, said catalyst being activated by the adjustment of a substantially aqueous slurry to a pH range from about 5 to about 10.

2. The process according to claim 1 wherein the cation is sodium.

3. The process according to claim 1 wherein the cation is potassium.

4. The process according to claim 1 wherein the cation is rubidium.

5. The process according to claim 1 wherein the cation is cesium.

6. The process according to claim 1 wherein the cation is lithium.

7. The process according to claim 1 wherein the isomerization is carried out at a temperature ranging from about 150° C. to about 175° C. in the presence of from about 0.25% to about 2% catalyst for from 2 to 4 hours.

8. The process according to claim 1 wherein the pinene-containing feed is α-pinene.

9. The process according to claim 1 wherein the pinene containing feed is β-pinene.

10. The process according to claim 1 wherein the pinene containing feed is turpentine.

References Cited

UNITED STATES PATENTS

| | | | |
|---|---|---|---|
| 3,140,322 | 7/1964 | Frilette et al. | 260—667 |
| 3,270,075 | 8/1966 | Derfer et al. | 260—675.5 |
| 3,642,928 | 2/1972 | Davis | 260—675.5 |
| 3,696,164 | 10/1972 | Davis | 260—675.5 |
| 3,700,746 | 10/1972 | Takacs | 260—675.5 |
| 3,700,747 | 10/1972 | Takacs | 260—675.5 |

DELBERT E. GANTZ, Primary Examiner

G. E. SCHMITKONS, Assistant Examiner

U.S. Cl. X.R.

208—Dig. 2; 252—455 Z; 260—683.65